Aug. 14, 1962 L. RIANHARD, JR 3,049,709

REMOTE CONTROL ACTUATED CHEMICAL-NUCLEAR POWERED COMMUNICATION SYSTEM

Filed Dec. 27, 1957 2 Sheets-Sheet 1

INVENTOR.
LOCKWOOD RIANHARD Jr.
BY
Wade Koontz and
Martin J. Finnegan
ATTORNEYS

INVENTOR.
LOCKWOOD RIANHARD Jr.
BY Wade Koontz and Martin J. Finnegan
ATTORNEYS 3,049,709

REMOTE CONTROL ACTUATED CHEMICAL-NUCLEAR POWERED COMMUNICATION SYSTEM

Lockwood Rianhard, Jr., Millenbeck, Va.

Filed Dec. 27, 1957, Ser. No. 705,722
5 Claims. (Cl. 343—225)
(Granted under Title 35, U.S. Code (1952), sec. 266)

Figure 2:
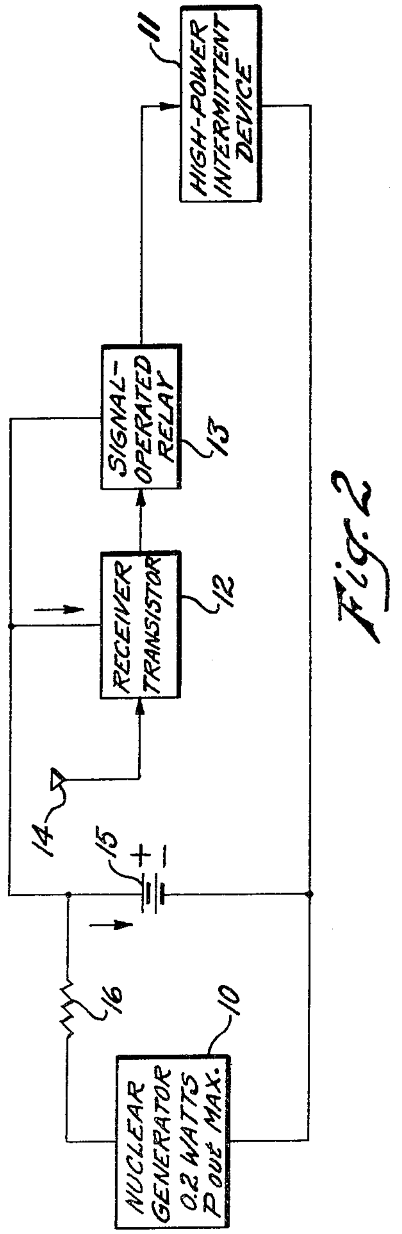

The invention described herein may be manufactured and used by or for the United States Government for governmental purposes without payment to me of any royalty thereon.

This invention relates to power plants, and particularly to the long-sustained maintenance of communications systems, or analogous apparatus in a state of readiness for immediate functioning, notwithstanding the absence of manual intervention, whenever a probing signal of predetermined electrical characteristics is beamed toward said apparatus from a remote location.

By way of pointing to one field of utility of the invention, it may be noted that the execution of military and related plans involving global and inter-planetary strategy can be greatly facilitated if radio receiving and transmitting equipment can be deposited in remote, isolated points and maintained in a stand-by condition, yet with the potentiality of self-activation, for signal-acknowledging purposes, whenever an authorized signal is directed to such stand-by apparatus, and without the presence of an attendant to initiate or monitor the operation.

Recent developments in a number of different fields have made possible a technological break-through in designing ground electronic equipment for long life and reliable unattended operation. An ideal basic component for such equipment is the radioisotope thermoelectric generator.

While high power drains have been necessary in the past in the design of electronic transmitters, receivers, and amplifiers, much lower drains are theoretically possible. The inefficiency of standard vacuum tubes and the expense of obtaining reliability at low power drain levels have prevented the design of minimum power equipment. Transistors and other solid state devices capable of operating at R-F frequencies have greatly increased the obtainable efficiencies of amplifier circuits.

The advances in nuclear research in recent years offer an ever-increasing supply of radioisotope materials from nuclear reactors. Many of these isotopes may be recovered from fission wastes and are potentially suitable for use as power supplies for low-current electronic equipment logically suited for transistor circuitry. There are many isotopes which might be considered for such application. Two that have been found to be promising for further development are promethium$^{147}$ and strontium$^{90}$. These do not emit gamma radiation and for this reason they simplify shielding problems.

There are several possible techniques for converting the energy emitted by the radioisotope into an electrical output suitable for driving transistor circuitry. One technique which appears the most promising at this time is the use of a thermopile. Using the latest available thermoelectric materials, the best estimate of the efficiency of a well-designed thermopile assembly is two percent. A feasibility study, started early in 1956, has been carried out with respect to this development. This and other techniques will be subject to future research.

The radioisotope thermoelectric generator, incorporating no moving parts, should operate through all extremes of temperature at essentially 100 percent reliability for its lifetime. The device may be used advantageously in conjunction with chemical cells to obtain high short-time output at low temperature as well as other benefits. The development of this generator opens many new design possibilities for equipment destined for remote and unattended operation.

Public interest has been aroused in recent years through the publicity received by a number of different "atomic batteries." However, power output of all these batteries is on the order of ten milliwatts, too low for their use as other than voltage devices. None of these "atomic batteries" can be scaled to sizes large enough to give practical power outputs to operate transistor amplifiers or other types of electronic circuitry.

The present invention utilizes, in lieu of an "atomic battery," a "thermal battery" using a radioisotope heat source and a nuclear thermopile. Since thermopiles designed for power generation have usually been referred to as thermoelectric generators, it is believed that the name most descriptive of such a device is "radioisotope thermoelectric generator," the term employed herein.

In recent years great advances have been made in semi-conductor theory, metallurgy, and solid state physics. The Signal Corps Engineering Laboratories (SCEL) of the Armed Forces developed several models of fuel-burning thermoelectric generators during World War II, but recent developments by SCEL have shown that some of the more efficient thermoelectric materials could not be used with the high temperatures of the fuel-burning thermoelectric generators. However, the lower temperatures developed by the radioisotope heat sources appear to present no such difficulty. Accordingly, the present invention utilizes a radioisotope thermoelectric generator having adequate efficiency for the described purpose. For this purpose radioisotopes recoverable from nuclear reactor fission wastes are preferable, since they are available at a reasonable cost in the required kilocurie quantities. Since radioisotopes which do not emit gamma radiation are preferable, in order to reduce shielding requirements, and since no pure alpha-emitting isotopes are present in fission wastes, it is desirable to select one of the "pure beta" emitting radioisotopes. Two isotopes answering these requirements are strontium$^{90}$-yttrium$^{90}$ and promethium$^{147}$.

An object of the invention, therefore, is to provide apparatus for maintaining unattended communications equipment in stand-by condition, so that a thermonuclear power generator may energize said equipment, when the occasion arises, as for example, when remotely triggered by a probing signal transmitted to the equipment from an aircraft flying toward the area, but still some miles distant therefrom.

Figure 1:
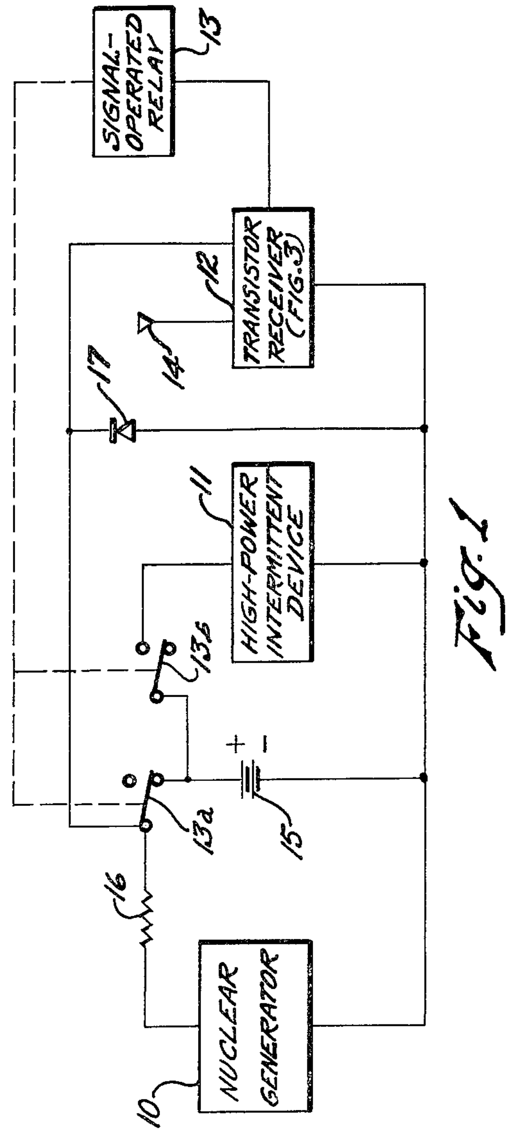
Figure 3:
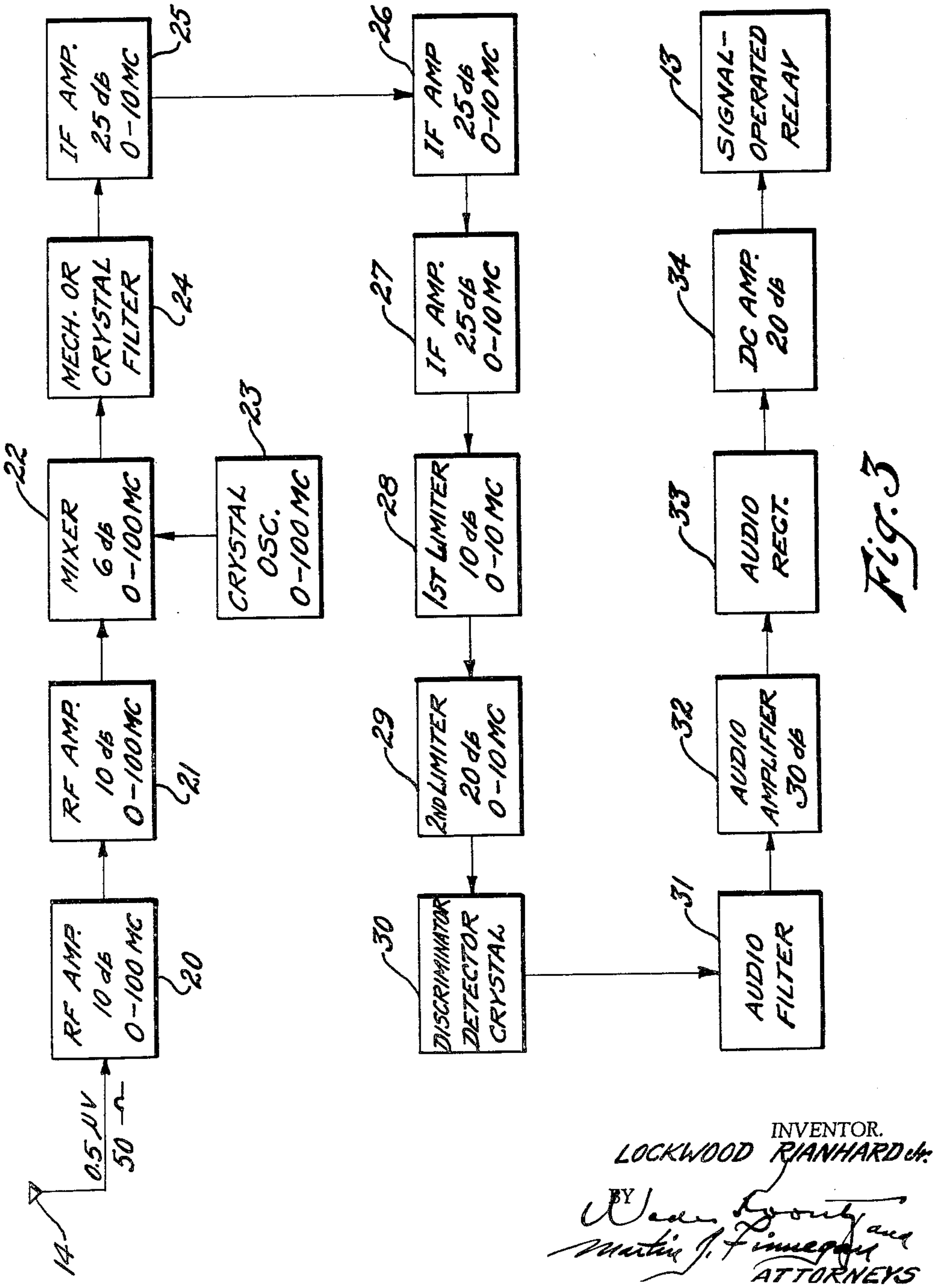

These and other objects will be apparent as the description proceeds, with reference to FIGS. 1, 2 and 3, wherein:

FIG. 3 illustrates F.M. transistor receiver circuitry; and FIGS. 1 and 2 show the manner of relay control of application of nuclear power thereto.

The circuitry of FIG. 3 has frequency ranges and minimum available gains, in decibels, as indicated by the legends applied to the successive blocks, 20 to 34, inclusive, with approximate total stage power drain of not more than 6 milliwatts in the I.F. stages. At low I.F. frequencies, a filter 24 (such as the "Collins" mechanical type) may be utilized to slice the available R.F. spectrum into desired channel width. At I.F. frequencies from 0.5 to 10 mc., filters such as the Hycon Eastern crystal type, which is subminiature, of moderate cost, and readily available, may be used. Discriminator 30 is also of the crystal type, which has relatively low transducer loss compared to conventional LC circuits, especially at very narrow band widths and high I.F. frequencies.

The output of this receiver can be a Yes-No type of intelligence, for operation of relay 13, which receives the output of audio stages 31, 32 by way of rectifier 33, and D.C. amplifier 34. Total power consumption of this receiver circuit would be approximately 90 milliwatts at three volts, or less than half the maximum anticipated output of the nuclear generator.

The remainder of the nuclear generator output could be used to trickle charge the NICAD battery shown at 15 in FIGS. 1 and 2. In the ideal case, the duty cycle or the high-power drain equipment at 11 (FIGS. 1 and 2) may be such that the trickle charging by the nuclear generator 10 would be sufficient to bring the NICAD battery 15 back to full charge after each use.

As shown in FIG. 1, an extra set of relay contacts 13*a* (make before break) transfers the nuclear generator from a load consisting of the receiver 12 and the NICAD battery 15 to a load consisting of the receiver 12 and a voltage regulating Zener diode 17, which absorbs the current formerly trickling into the NICAD battery 15 at a slightly higher voltage than that required to charge the said battery. This is to prevent the Zener diode 17 from wasting power when no signal is being received. The other set 13*b* of relay contacts transfers the heavy drain load 11 to the NICAD battery 15 very shortly after the battery switching has been accomplished by the first set of contacts 13*a*. The purpose of disconnecting the battery 15 from the receiver 12, in the upper position of switch contact 13*a*, is to prevent the voltage charge of the NICAD battery 15 under heavy drain conditions from affecting receiver operation. Resistance 16 has an ohmic value sufficient to produce an energy dissipation on the order of 0.2 watt during stand-by . Because of the combined loads constituted by resistance 16 and battery 15, the voltage level at diode 17 is not sufficient to overcome the Zener factor of diode 17 during the long stand-by cycle, hence there is no waste of power through diode 17 when no external signal is being received at antenna 14. That is, diode 17 absorbs current only when switch 13*a* is in the upper position. Thus, it fulfills its primary function, namely; to substitute for battery 15 as a receiver of the current output of generator 10 for the duration of the relatively short periods of signal reception at antenna 14. At all other periods diode 17 acts as a barrier to current flow, hence the entire output of generator 10 tends to enter the battery 15 rather than passing through diode 17.

To help maintain efficient operation of the chemical battery 15, the wasted heat output (98 percent of the total heat generated by the radioisotope mass or about 9.8 watts) could be used to raise the temperature of the chemical cell above a low ambient by suitably insulating the package.

There has thus been disclosed a system wherein a radioisotope thermoelectric generator consists of a radioisotope heat source within a thermally-insulated package or housing which contains many thermocouples connected in series. The thermocouples have their hot junctions near the heat source and their cold junctions near the outside of the package. No moving parts are required. A minimum useful life at full load of one year will be realized.

There is no fixed-temperature attained by the heat source because its temperature depends upon the ambient temperature outside the package. The rate of heat flow out of the package is fixed by the amount of radioisotopes present. It is unaffected by the ambient temperature or by the degree to which the package is insulated. Any given degree of insulation of the package, however, represents a certain fixed overall resistance to heat flow. For a given heat source size in watts, the temperature differential between the heat source and the package exterior, $\Delta T$, must be fixed. The electrical output of the generator for a given number and type of thermocouple approaches a direct proportionality with respect to $\Delta T$. Therefore, the generator electrical power output should be substantially constant whether the external temperature is $-100°$ C. or $+100°$ C. even though the heat source temperature would vary by 200° C. over this range of external temperatures.

The generator 10 is expected to utilize a 10-watt heat source at approximately two percent efficiency so that 0.2-watt output will be available. This is sufficient to operate low-power devices such as the transistorized amplifiers, radio receiver, and relays shown herein. It is not sufficient for higher power devices such as radio transmitters.

Many advantages can be gained through the use of radioisotope thermoelectric generator in conjunction with ordinary chemical batteries such as the one indicated at 15.

The radioisotope power source has been shown as operating a sensing device which activates a relay to turn on chemical battery-powered, higher-power-drain equipment, shown at 11. The waste heat from the radioisotope can be used to warm the chemical battery 15 sufficiently for satisfactory operation at ambient temperatures as low as $-65°$ F. In addition, between periods of use of the chemical battery, the radioisotope thermoelectric generator can be used to trickle-charge or even recharge the chemical battery.

It can be shown that for a spherical source giving off a fixed amount of heat, the overall efficiency of the thermoelectric generator is approximately inversely proportional to the diameter of the source. The importance of having as concentrated a source as possible is therefore evident.

Based on the anticipated 200-milliwatt output power of the nuclear generator 10, the receiver block diagram of FIG. 3 and the system block diagram of FIG. 2 demonstrate the feasibility of using the nuclear generator to maintain a relatively high capacity nickel-cadmium cell in a fully charged condition by trickle charging, and also to furnish power to operate a transistor-, "continuously-listening" type of receiver, as shown at 12 (representing the circuitry of FIG. 3).

The nickel cadmium (NICAD) battery selection was based on the following considerations:

Ability to be trickle charged,
Low rate of self discharge,
High mechanical strength,
Freedom from damage caused by temperature extremes, including freezing,
Low water consumption,
Capacity not reduced by overcharging, and
Because of the sudden slight voltage rise upon becoming fully charged, a very low power drain voltage regulator may be devised to prevent overcharging and the consequent evolution of gas. There is no evolution of gas previous to overcharge. It may further be advisable to pressurize the cells to preclude gas formation in cases where the unattended time intervals of the equipment are very long.

What is claimed is:

1. In a communcations system, in combination, a device requiring a high level of power input for relatively short time intervals of infrequent occurrence, a nuclear power generator, of relatively low capacity, a storage battery and signal receiver electrically connected with said nuclear power generator, remotely-actuated switching means controlling flow of current between said battery and infrequently operated high-power device, and means including a radio-frequency signal pick-up antenna circuit for feeding an actuating signal to said switching means, by way of said signal receiver.

2. The system of claim 1, including a uni-directional conductive means, in parallel-circuit relationship to said signal receiver, and co-operating with said switching means to control energization of said signal receiver.

3. The system of claim 1 wherein said generator utilizes radioisotopes derived from the waste residual products of nuclear fission reactions.

4. The system of claim 1, wherein said signal receiver includes FM circuitry modulated by a crystal oscillator, and also includes a crystal filter, and a crystal discriminator of relatively low-loss characteristic, said circuitry being of microvolt sensitivity.

5. In a power plant, in combination, a nuclear power generator capable of continuous operation over long periods, even when unattended, at relatively low capacity, a chemical storage cell, an intermittently utilized power-consuming device having a relatively high power demand characteristic, and radio-frequency signal actuated switching means controlling flow of energy from said generator to said storage cell and power-consuming device.

References Cited in the file of this patent

UNITED STATES PATENTS

| | | |
|---|---|---|
| 1,118,269 | Creveling | Nov. 24, 1914 |
| 1,787,813 | Breisch | Jan. 6, 1931 |
| 1,804,526 | Coxhead | May 12, 1931 |
| 2,529,443 | Bach | Nov. 7, 1950 |
| 2,671,623 | Toulmin | Mar. 9, 1954 |
| 2,693,572 | Chase | Nov. 2, 1954 |
| 2,813,242 | Crump | Nov. 12, 1957 |
| 2,884,518 | O'Neill | Apr. 28, 1959 |
| 2,912,574 | Gensell | Nov. 10, 1959 |

OTHER REFERENCES

Article: "Radioactive Heat to Electricity" in "Chemical and Engineering News," Oct. 18, 1954, page 4183.

"Kerosene Radio" in "Popular Science," June 1956, page 112.

"Nuclear Batteries," Garrett, pp. 446–449, Journal of Chem. Education, vol. 33, No. 9, September 1956.

Linden et al.: Electronics, July 18, 1958, pp. 59–65.